Figure 1:
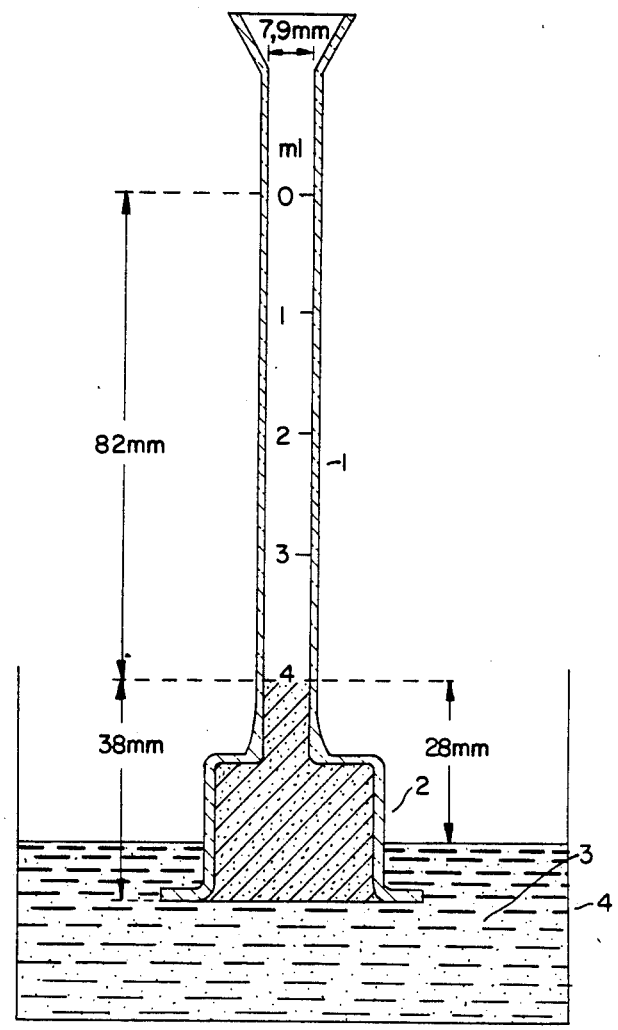

United States Patent [19]
Burkhardt et al.

[11] Patent Number: 4,565,577
[45] Date of Patent: Jan. 21, 1986

[54] POLLUTANT-RESISTANT SEALING COMPOSITION

[75] Inventors: Rudolf Burkhardt, Troisdorf; Hansjürgen Hass, Troisdorf-Spich, both of Fed. Rep. of Germany

[73] Assignee: Dynamit Nobel AG, Troisdorf, Fed. Rep. of Germany

[21] Appl. No.: 634,317

[22] Filed: Jul. 24, 1984

[30] Foreign Application Priority Data

Jul. 26, 1983 [DE] Fed. Rep. of Germany ....... 3326836

[51] Int. Cl.$^4$ .................................................. C04B 7/00
[52] U.S. Cl. ........................................ 106/85; 106/90; 106/97; 106/98; 106/117; 106/287.12; 106/900
[58] Field of Search ................... 106/900, 901, 287.12, 106/90, 97, 117, 85

[56] References Cited

U.S. PATENT DOCUMENTS

| | | | |
|---|---|---|---|
| 2,729,572 | 1/1956 | Torkelson | 106/287.12 |
| 3,491,049 | 1/1970 | Gibson et al. | 106/117 |
| 3,772,065 | 11/1973 | Seiler | 427/299 |
| 4,095,988 | 6/1978 | Jancek et al. | 106/85 |
| 4,124,405 | 11/1978 | Quienot | 106/85 |
| 4,282,036 | 8/1981 | Finsterwalder et al. | 106/97 |
| 4,357,167 | 11/1982 | Kellet et al. | 106/97 |
| 4,424,075 | 1/1984 | Schmidt | 106/287.12 |
| 4,432,666 | 2/1984 | Frey et al. | 106/900 |
| 4,433,013 | 2/1984 | Puhringer | 427/337 |

OTHER PUBLICATIONS

Solomon, D. H. et al., "Chemistry of Pigments and Fillers, pub. 1983, Wiley & Sons, pp. 96–98 and 143–148.

Primary Examiner—Helen M. McCarthy
Attorney, Agent, or Firm—Felfe & Lynch

[57] ABSTRACT

The present invention relates to compositions for making sealing walls, dump linings and the like, especially barriers placed in the ground. The compositions contain expandable clay minerals, cement and fillers in aqueous suspension, as well as additives of alkali metal aluminates and alkoxy alkylsilanes. On the basis of these additives, the sealing action against water and pollutants is substantially improved, so that sealing walls prepared therefrom, especially in combination with an also pollutant-resistant sealing floor, can be used for the encapsulation of pollutants in permeable soils.

5 Claims, 2 Drawing Figures

POLLUTANT-RESISTANT SEALING COMPOSITION

BACKGROUND OF THE INVENTION

The subject matter of the present invention is setting compositions of absorbent clay minerals, hydraulic binding agents, fillers and water. They are used principally for producing sealing walls and other such subsurface barriers which are placed in the soil for the purpose of preventing the propagation of pollutants that may have entered the ground.

Pollutants which enter the ground as a result of any kind of uncontrolled events must be prevented from diffusing any further and contaminating the ground water. Such pollutants are, for example, hydrocarbons, chlorinated hydrocarbons, phenols, cyanic and sulfur compounds from gas scrubbing compositions, as well as leachates from leaking refuse dumps.

Measures are already known for preventing the spread into larger areas of such pollutants that may have entered the ground. It is known, for example, to use vertical barrier walls based on foundation engineering technology to enclose soils that have been contaminated with pollutants. The material of such sealing barriers, which are in the form of slit walls or shell walls, are expandable clay minerals, hydraulic cements, water and, in some cases, fillers. After fabrication, compositions containing these materials yield walls which have a greater elasticity than concrete, so that even relatively strong tremors do not tend to cause cracking.

The k values of these walls are approximately $10^{-8}$ $ms^{-1}$.

The permeability coefficient k is calculated on the basis of the simplified Darcy equation, $$k = Q/F \cdot I \text{ cm/sec,}$$

wherein:
Q = rate of seepage in cubic cm per sec
F = filter area in sq cm
$\Delta h$ = height of water column in cm
D = thickness of permeated layer in cm
I = hydraulic gradient = $\Delta h/D$ Thus, the permeability is low enough to keep an excavation sufficiently dry; this is not, however, to say that the pollutant concentration outside of the area enclosed by these walls is prevented from exceeding the maximum allowable concentration. A disadvantage of barriers made from these substances is also the fact that the sealing action of clay materials which are contained in these compositions is greatly reduced by chemicals dissolved in water and by organic liquids. The permeability can thus increase by a factor of a thousand as the result of attack by these chemicals (cf. Anderson, Brown, Green, Proc. 8th Am. Res. Symp. USEPA 1982, pp. 179-190).

The problem therefore existed of enveloping pollutants in the soil and of discovering a barrier wall material for the production of confining walls for the envelopment (known as "macroencapsulation") of an area contaminated by a pollutant. Such a material should, after setting, largely prevent the escape of the pollutants from the enveloped area and their penetration into the ground water for a long period of time.

THE INVENTION

For the solution of this problem, a pollutant-resistant, setting composition has been found for sealing walls and other soil barriers. The composition contains absorbent clay minerals, hydraulic binding agents, fillers and water, and is distinguished by an additional content of alkyl trialkoxysilanes of the formula $$RSi(OR')_3,$$

wherein R represents an alkyl moiety of 2 to 6 carbon atoms and R' represents equal or different moieties of 1 to 4 carbon atoms, or the hydrolysis products of these silanes, and alkali aluminates.

The silanes are added to the compositions in amounts of 0.05 to 5% of the weight of the solid content of the composition. They can be added to the composition without solvent or after dissolving in water. The aqueous solution is prepared in a known manner in the weak-acid range. (pH from 2 to 5, prepared with diluted sulphuric or formic acid, for example). The alkyl silane will then be mostly in the form of silanols. In the formula for the alkyl silanes, $R Si(OR')_3$, R' then also represents hydrogen.

The hydrolysis products of the alkyl silanes are therefore to be understood to refer to these silanols as well as oligomers of these compounds, which are still water-soluble, and contain a maximum of 8 silicon atoms, preferably up to 5 silicon atoms per molecule.

The alkyl moiety of the alkyl silanes preferably is unsubstituted. Preferred alkyl moieties are propyl and isobutyl.

The alkali aluminate is best added to the composition in the form of an aqueous solution. Its amount will also depend on the amount of solids. The alkali aluminate is calculated as $Al_2O_3$ and is between 0.01 and 1.5% of the weight of the solid content of the composition.

The term, "expandable clay minerals," as used herein, refers principally to silicates having a layered lattice structure, in which the layers can be physically separated from one another by the penetration of water. Examples of these minerals are kaolinite, attapulgite, the bentonites, and the montmorillonites. The content of these absorbers in the compositions of the invention is between 1 and 8% of the weight of the total composition.

The term, "hydraulic cements," as used in conjunction with the invention, is to be understood to mean inorganic cements which set by hydration, such as, for example, hydraulic mortars or cements. Their content in the composition of the invention is between 8 and 20% of the weight of the total composition.

The fillers can be contained in amounts of up to 70% of the weight of the solid content of the composition. Examples of usable fillers are rock flours made, for example, of limestone, dolomite or quartzite rock. Also other fillers, as for example asbestos or rock wool, can be used.

The compositions can furthermore contain known additives which affect fluidity during the mixing process, as well as the consistency and setting of the composition. Examples of these substances are phosphates, (0.1 to 5 wt.-%), alkali silicates (up to 20 wt.-%), sugars and their derivatives (up to 2 wt.-%) and other organic fluidizers/plasticizers for concrete (up to 2 wt.-%). (The dimension wt.-% in this para refers to the total composition.)

The preparation of the compositions of the invention is performed by means of mixing machinery commonly used in the production of sealing wall compositions. The additives of the invention are added during the mixing process; they can also be premixed with a portion of the solids. The water content in this case is adjusted such as to produce a viscous, unctuous mass. From these compositions, sealing walls can be produced which have a greater sealing effect and a greater resistance to pollutants than compositions without the additives of the invention. On the basis of these properties, they are particularly well suited for the enveloping of polluted areas in permeable soils. Such envelopment can also be combined easily with a likewise pollutant-resistant sealing floor.

The compositions of the invention are furthermore suitable, alone or in combination with other known sealing materials, such as plastic films for example, for the lining of newly created dumps for wastes containing pollutants.

EXAMPLES

Example 1

A conventional sealing wall composition A and a composition B modified in accordance with the invention were prepared on the basis of the same basic formula, as follows:

A: 24 g of sodium bentonite was stirred with 400 ml of water for 15 minutes, and, with vigorous stirring, 460 g of limestone flour and 100 g of HOZ 35 L blast furnace cement (according to DIN 1164) were added successively, in portions.

B: 2.3 g of aqueous sodium aluminate solution having an $Al_2O_3$ content of 25% by weight was dissolved in 183 ml of water. 460 g of limestone flour was suspended in this solution, and to this suspension was added a solution of 3 g of propyltrimethoxysilane in 27 ml of water (prepared at a pH of 3.3 with, for example, diluted sulphuric or formic acid). The suspension thus obtained was mixed with a suspension of 24 g of bentonite in 190 ml of water prepared in a separate procedure, and 100 g of blast furnace cement was mixed into the mixture thus obtained.

The two compositions were tested for their characteristics in the test tube-beaker set up represented in FIG. 1 of the drawings. The test tube is graduated in milliliters. Its expanded bottom end 2 is filled with the composition up to the bottom mark (4 ml). After it has set, the tubes are placed, as shown in FIG. 1, with their expanded bottom end submerged to a depth of 10 mm in a mixture of sand and water 3 contained in a beaker 4. The tubes are then filled up to the top mark (0 ml) with water in the one case and with a saturated, approximately 0.1% aqueous trichloroethylene solution in the other. The settling of the liquid column, which is read and filled up again at regular intervals, showed the amount of liquid Q which has percolated through, and which is proportional to the permeability.

Figure 2:
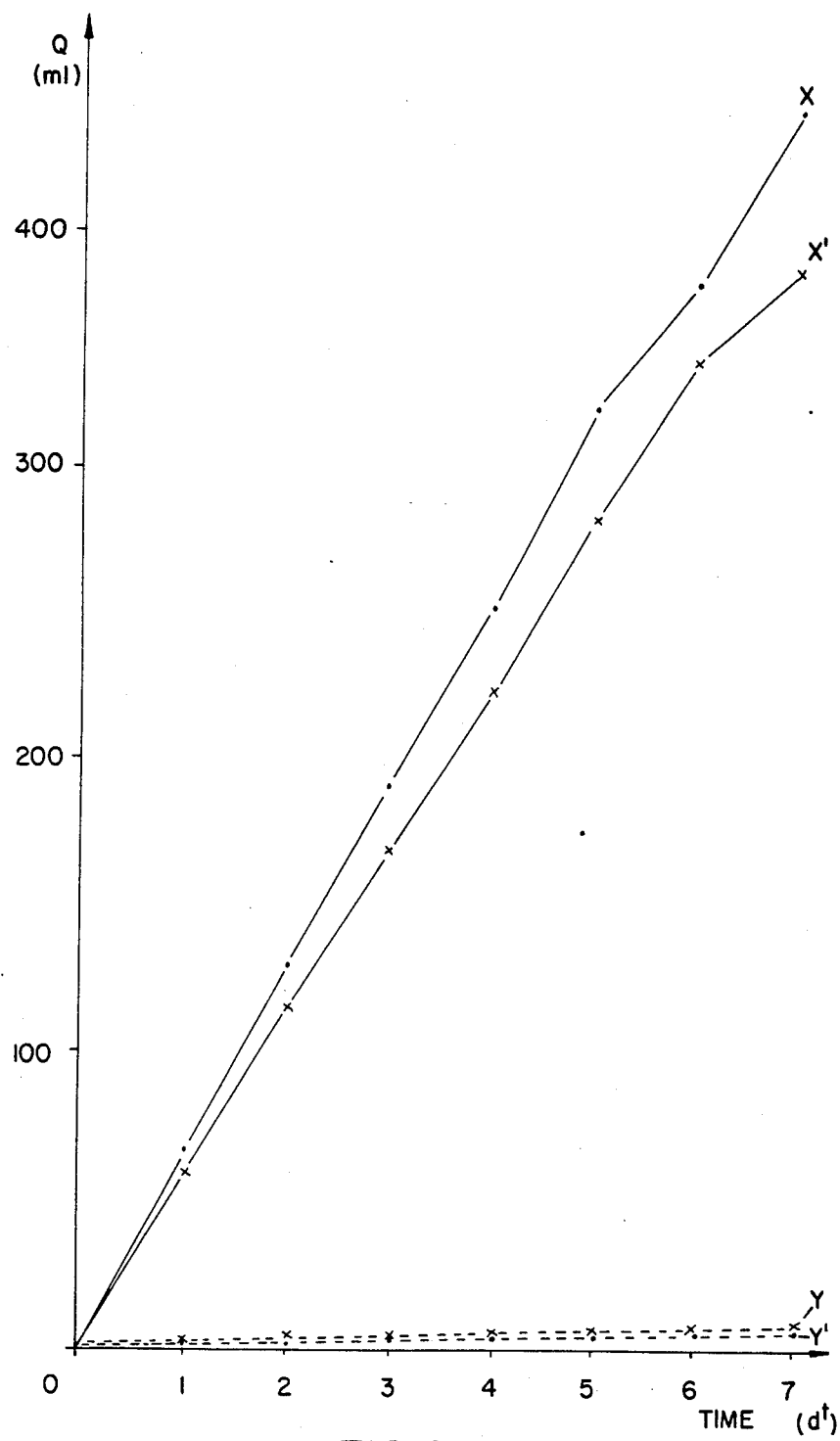

In FIG. 2 the test results obtained are represented graphically. In this figure, the curves X and X' show the results obtained with the compositions not in accordance with the invention, curve X representing the data for water and curve X' the data for the trichloroethylene solution. Curve Y shows the results for the composition B in accordance with the invention for water, and curve Y' for the aqueous trichloroethylene solution. The composition of the invention accordingly seals substantially better against water and aqueous trichloroethylene solution than the unmodified composition. The amounts passed through were reduced to about 2 to 7%. The test conditions were the same for all compositions.

During the tests, which were prolonged to 28 days in the case of the composition of the invention, the permeability remained virtually constant.

Example 2

Following the same basic formula, but using 3 g of isobutyltrimethoxysilane instead of propyltrimethoxysilane, a composition modified in accordance with the invention was prepared in a manner similar to Example 1B. The unmodified composition, however, unlike Example 1A, was prepared by mixing the suspension of 24 g of sodium bentonite in 190 ml of water with the suspension of 460 g of limestone flour in 210 ml of water, followed by the addition of cement, so as to come closer to the preparation of the modified composition. (No difference in properties from those of the composition prepared as in Example 1A could be found.)

The following is the result of the permeability testing, which was performed as in Example 1:

After a curing period of 3 days, the permeability remained virtually constant during the test period of 7 days. Using water and using trichloroethylene (TCE) solution, the total percolation in seven days was as follows:

| Composition | Input | ml in 7 days |
| --- | --- | --- |
| Comp. of the invention | water | 21.2 |
| Unmodified | water | 230.6 |
| Comp. of the invention | TCE solution | 20.7 |
| Unmodified | TCE solution | 263.2 |

EXAMPLE 3

Using a laboratory mixing unit with circulation pump, compositions in accordance with the invention were prepared in accordance with the following formulas:

| Component | Formula I | Formula II |
| --- | --- | --- |
| Water | 2500 ml | 2000 ml |
| Bentonite | 120 g | — |
| Clay flour | — | 120 g |
| Limestone flour | 2300 g | 2300 g |
| Propyltrimethoxysilane | 15 g | 15 g |
| Sodium aluminate solution with 25% $Al_2O_3$ by weight | 11 g | 11 g |
| Portland cement PZ 35 F | 520 g | 520 g |

The components were fed into the mixer in the above order, and mixed for about 15 minutes after each addition (bentonite and clay flour 10 minutes each). The propyltrimethoxysilane was added in the form of a 10% aqueous hydrolyzate (see Example 1), the sodium aluminate in the form of a tenfold dilution. The amounts of water required for this purpose were contained in the total amounts stated.

The same mixtures were prepared on a smaller scale (1:5) using a laboratory mixer. The poorer homogeneity of these compositions could be recognized from the water percolation of the clay flour composition, which did not occur in the case of the composition mixed with the circulation pump.

In the permeability test (as in Example 1), the following total percolations (water) were found after a test period of 19 days:

| Mixer | Formula | ml in 19 days |
| --- | --- | --- |
| Circulation pump | I | 18.8 |
| Circulation pump | II | 13.9 |
| Stirrer | I | 30.7 |
| Stirrer | II | 54.3 |

According to these findings, more homogeneous compositions having still lower permeabilities are to be expected when the pump mixers commonly used at the worksite are used than when laboratory mixers are used, as in Examples 1 and 2.

It will be understood that the specification and examples are illustrative but not limitative of the present invention and that other embodiments within the spirit and scope of the invention will suggest themselves to those skilled in the art.

We claim:

1. A pollutant-resistant composition for sealing walls and other soil barriers comprising expandable clay minerals present in an amount of 1 to 8 wt.-% of the composition, hydraulic binding agents settable by water without activators, fillers and water, a trialkoxysilane of the formula R—Si(OR')$_3$ in an amount of 0.5 to 5 wt.-% with respect to the solid content of the composition, in which R represents an aliphatic moiety having 2 to 6 carbon atoms and R' is hydrogen or identical or different alkyl moieties of 1 to 4 carbon atoms, or their hydrolysis products, and alkali aluminates in such amounts that their $Al_2O_3$ content corresponds to 0.01 to 1.5 wt.% of the solid content of the composition.

2. The composition of claim 1, wherein the trialkoxysilane is selected from the group consisting of propyltrimethoxysilane or isobutyltrimethoxysilane.

3. The composition of claim 1, wherein the alkali aluminate is sodium aluminate.

4. The composition of claim 1, wherein the expandable clay minerals are silicates with stratified lattice structures.

5. The composition of claim 4, wherein the hydraulic binding agents are hydraulic mortars or cements.

* * * * *

UNITED STATES PATENT AND TRADEMARK OFFICE
CERTIFICATE OF CORRECTION

PATENT NO. : 4,565,577

DATED : January 21, 1986

INVENTOR(S) : Rudolf Burkhardt et al

It is certified that error appears in the above-identified patent and that said Letters Patent is hereby corrected as shown below:

Column 2, line 31, "of" should be --in--

Column 4, line 56, "15" should be --5--

Signed and Sealed this

Twenty-ninth Day of July 1986

[SEAL]

Attest:

Attesting Officer

DONALD J. QUIGG

Commissioner of Patents and Trademarks